Dec. 26, 1961 W. F. GRUPE 3,014,301
CHART MEDIUM
Filed April 16, 1956
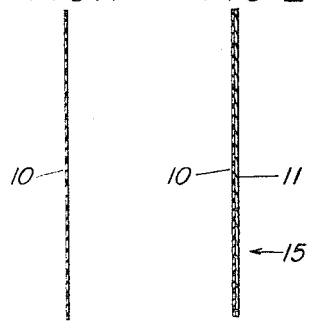
FIG.1  FIG.2
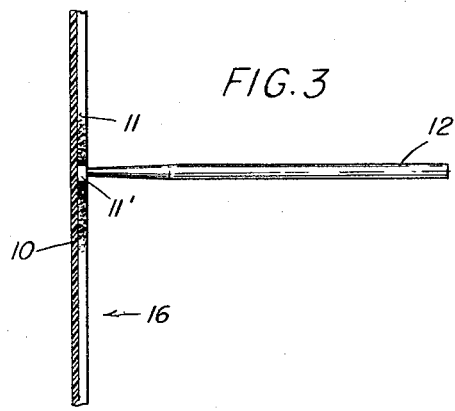
FIG.3
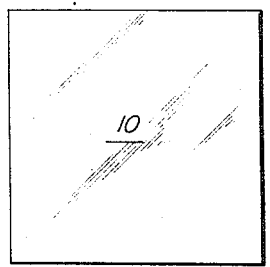
FIG. 4
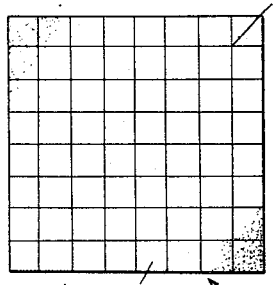
FIG. 5
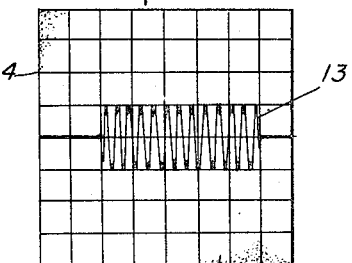
FIG.6
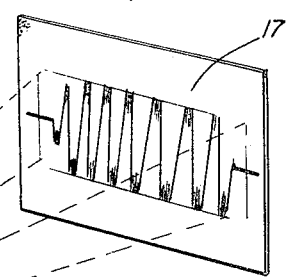
FIG.7
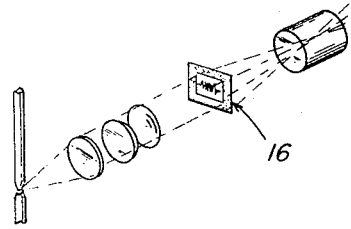
INVENTOR.
William F. Grupe
BY Lucke & Lucke

United States Patent Office 3,014,301
Patented Dec. 26, 1961

3,014,301
CHART MEDIUM
William F. Grupe, River Edge, N.J., assignor to Peerless Roll Leaf Company, Inc., Union City, N.J., a corporation of New York
Filed Apr. 16, 1956, Ser. No. 578,544
9 Claims. (Cl. 41—21)

This invention relates to recording charts. More particularly it refers to a chart medium for use in recording units with a heated or a pressure stylus, and/or a pen containing a solvent, to which use, however, it is not restricted.

Chart mediums now in commercial use, use a white opaque, heat and pressure-sensitive coating on a dark paper backing. Chart lines and other required data are then printed in conventional opaque inks on the white coating. Some of the recording machines use a hot stylus or a pressure stylus instead of a pen. The heat or pressure of the stylus dissolves or clarifies the coating, thus making the dark colored backing visible. The graph is therefore recorded by revealed lines of dark colored backing.

Accurate copies of charts are best obtained by photographic reproduction. In order to reproduce conventional charts, it is necessary to first photograph the chart and develop a negative before subsequent positive prints may be made.

Some charts are printed in conventional opaque inks on a translucent paper backing. Reproductions of translucent paper charts are not as clean and clear, however, as is obtained from a transparent negative. Time is often a most critical factor in obtaining copies of charts such as cardiographs. To permit more than one person to study or read information developed in transparent lines or type, etc., the negative film is mounted in a projection unit and the chart with all developed information projected onto a screen or wall in magnified dimensions. Reduction of the time factor in obtaining a clear readable film is therefore of utmost importance.

I have now invented an improved chart medium from which copies can not only be immediately and economically reproduced in full context, but one which is stable under the normal temperatures encountered in shipping and storage, and resistant to normal handling. A chart medium made according to my invention uses a transparent film backing instead of an opaque or translucent paper backing, the dimensions of the film remaining stable in atmospheric changes. Upon this film, I deposit a white, opaque coating which is heat, pressure and solvent sensitive for use with a heat or pressure stylus. Either type of stylus clarifies the coating at point of contact without removing it to reveal the transparent film carrier. Or in a similar manner, a solvent dispensing pen may be used to form clear, transparent lines by dissolving the opaque precipitate in the deposit without reducing the solid content of the coating, which remains integral across the entire charted sheet.

Chart lines may be printed on the coating with a dyed solvent. The solvent, similar to that used in the graph pens described above, merely clarifies the opacity of the coating at point of contact without removing, reducing or otherwise affecting the continuously uniform thickness of the deposit and at the same time leaves a residue of the dye or ink in the photographically transparent chart lines. Red dye is preferable for its qualifications in transmitting photographic rays which other colors tend to block. Graphs made on my chart medium are clearly legible, having a photographically positive appearance to the eye and the camera while serving as a perfect negative for contact photographic reproduction and projection purposes. The original chart thereby functions as a combination negative and a positive. This recording medium permits the evaluation of recorded data through a photocell system by virtue of transmitted light through the clarified areas.

Due to the pressure-sensitive characteristic of this chart, typewritten information may be impressed on it by clarifying the opacity of the coating at point of contact to form clear transparent characters suitable for immediate photographic reproduction or projection.

My improved medium may also be used with conventional pen-operated chart machines, wherein solvents are substituted for commercial ink to record the penned transparentized graphs.

Further objects, features and advantages of the invention will be more readily seen from the following detailed description of the preferred embodiments of the invention as claimed and as illustrated in the accompanying drawings, in which:

FIG. 1 is a cross-sectional view of a transparent film base or carrier taken from line 1—1 of FIG. 4;

FIG. 2 is a cross-sectional view of a chart medium taken along line 2—2 of FIG. 5;

FIG. 3 is an enlarged cross-sectional view taken along line 3—3 of FIG. 6, illustrating the method and means of making a graphic impression;

FIG. 4 is a top plan view of the transparent film carrier shown in FIG. 1;

FIG. 5 is a top plan view of the chart medium shown in FIG. 2;

FIG. 6 is a top plan view of the graph shown in FIG. 3; and

FIG. 7 is a diagrammatic showing of a transparent chart projection.

An extremely hard surfaced transparent film 10 is used as the chart carrier or backing such as a polyethylene terephthalate or polyester film, sold under the registered trademark "Mylar." The dimensions of this film are stable in the atmospheric conditions of this country, including temperature variations encountered in transit and storage.

A white opaque coating 11 is deposited on one side of the film base or carrier 10. This coating is formed from an unstable solution of nitrocellulose in acetone and xylol. This single thin, film-forming layer is light-impervious and requires no additional layers, pigments or fillers to effect photographic opacity.

The choice of plasticizers and their arrangement is, however, important and unique. Plasticizers must be selected which will not interfere with: firstly, the precipitation of the acetate; secondly, making the dry coating more responsive to transparentizing or "marking" by heat and/or by pressure. When subjected to sufficient heat or pressure, however, as by contact with a heated or pressure stylus 12, the suspended precipitate in the deposit is dissolved to form a clear, sharp transparent graph or track 13.

Whiteness and opacity of the coating deposited from this "clean solution" is obtained without the use of any pigment and results from the acetone evaporating first, leaving a high percentage of xylol and nitrocellulose in solution, from which the nitrocellulose is precipitated as a white solid. This technique is well known in the art.

The addition of wax to the coating mixture effects an even greater responsiveness to heat or pressure "marking" and also acts as a lubricant for the "marking" stylus 12.

A representative formula is as follows:

| Percent | |
|---|---|
| 9.0 | R.S. nitrocellulose, dry. |
| 1.5 | Castor oil. |
| .3 | Paraffin. |
| 3.9 | Ethyl alcohol. |
| 49.0 | Acetone. |
| 36.3 | Xylol. |
| 100.0 | |

The final product resulting from the above-stated combination and arrangement of chemical materials produces a coating 11 having a maximum response to transparentizing by heat, pressure, or solvent, and at the same time is not susceptible to deterioration at atmospheric temperatures encountered in this country.

The chart medium is completed by "printing" chart lines 14, inscriptions or imprints (not shown) on the white coated surface with a solvent such as Cellosolve or carbitol acetate to which a color dye is added. This produces a printed chart 15 with the clarified lines color dyed but still photographically transparent as indicated in FIGS. 5 and 6. In commercial use, a roll or sheet of coated transparent film 10 may be printed from intaglio engraved cylinders (not shown) which deposit a controlled amount of dye colored solvent on the chart base or coated surface 11.

Red dye is usually preferred since the color red is the least obstructive for photographic purposes. A suitable dye solution may be made in the conventional manner by dissolving a red pigment in the above stated solvents, such as in ethyl alcohol or the like.

The resulting medium is a dyed, transparently lined white opaque chart 15 of uniform thickness, the opacity of which is merely clarified or transparentized as indicated at 11' in FIG. 3 by contact with a graph heat or pressure stylus 12 or solvent dispensing pen, to produce a negative 16 from which full, accurate reproduction by any photographic process may be immediately taken.

One desirable feature of this chart is that it can be used as a positive transparency for projection 17 onto screens or other mediums to facilitate study in magnified form as shown in FIG. 7.

My new chart medium may be also adapted for conventional pen-operated machines wherein graphs were originally recorded in commercial inks. For this modification, a solvent would be substituted for the ink to record the graph on the same principle as the hereinabove described chart lines were "printed." Open-cupped pens in use on pen-operated chart machines, however, are not suitable for use with nitrocellulose solvents, due to the rapid evaporation of this substance. A special metal tube pen has been constructed with a closed tank and a ball point end, however, to convert these machines for use with this improved chart medium.

The forms of the invention herein described are presented merely as examples of how the invention may be embodied and applied. Other forms, embodiments and applications of the invention coming within the proper scope of the appended claims, will, of course, suggest themselves to those skilled in the art.

I claim:

1. A chart medium suitable for receiving accurate inscriptions from a low powered, rapidly moving scriber means, said medium comprising a supple, extremely hard, transparent film backing, a pressure, heat and solvent sensitive coating obscuring the transparency of said backing, said coating consisting of a thin film of loosely bound opaque nitrocellulose particles suspended in a xylol precipitated lacquer and having been precipitated by evaporation of a volatile organic solvent, said separate particles within said lacquer being transparentized when subjected to local pressure, heat and solvent, said transparentized particles cooperating with said backing to form transparent inscriptions on said medium, the surface of said coating remaining continuously smooth throughout its opaque and transparent areas to facilitate the sliding of such scriber means when oscillated thereover.

2. A chart medium according to claim 1 wherein said backing comprises a polyester film.

3. A chart medium according to claim 1 wherein said inscriptions comprise transparent grid reference lines in an unlimited portion of the area of said coating.

4. A chart medium according to claim 1 wherein said transparent inscriptions comprise dissolved particles in said coating.

5. A chart medium according to claim 1, in which said precipitated particles are precipitated by evaporation of acetone.

6. A chart medium according to claim 3 wherein said transparent lines are of a contrasting color to that of said coating.

7. A chart medium according to claim 6 wherein said coating can be transparentized by a tinted organic solvent to form said colored transparent lines.

8. A transparent chart medium suitable for receiving inscriptions from a solvent printing intaglio engraved cylinder and solvent dispensing pen, said medium comprising a supple polyethylene terephthalate backing, a thin light-impervious coating of nitrocellulose precipitate covering one surface of said backing, said precipitate having been precipitated by evaporation of a volatile organic solvent, dissolved portions of said precipitate forming transparent grid lines disposed throughout an unlimited area of said coating and a transparent track intersecting said grid lines throughout a limited area thereof, the distribution of solids in said dissolved and undissolved portions of said coating remaining constant throughout said limited and unlimited areas.

9. A method of making a transparent chart medium suitable for receiving transparent inscriptions from an intaglio printing cylinder, stylus and solvent dispensing pen comprising mixing about 9% dry nitrocellulose and about 1.5% castor oil with about 3.9% ethyl alcohol, then adding said mixture to an unbalanced solution of about 49% acetone and about 36.3% xylol, applying said solution to one side of a transparent polyester film allowing the acetone to evaporate first and leave the remaining xylol to precipitate the nitrocellulose as a light-impervious white coating on said film, then imprinting transparent chart lines and reference indicia on said medium by applying solvents having the properties of Cellosolve and carbitol acetate to selected portions of said opaque coating without disturbing the continuous and homogeneous distribution of solid coating content across said film.

References Cited in the file of this patent

UNITED STATES PATENTS

| 1,224,328 | Scritsmier | May 1, 1917 |
| 1,934,824 | Schwalbe | Nov. 14, 1933 |
| 2,313,808 | Dalton | Mar. 16, 1943 |
| 2,372,679 | Magid | Apr. 3, 1945 |
| 2,739,909 | Rosenthal | Mar. 27, 1956 |
| 2,898,112 | Flower et al. | Aug. 4, 1959 |

FOREIGN PATENTS

| 68,071 | Denmark | Nov. 22, 1948 |